(12) United States Patent
Yeom

(10) Patent No.: US 11,433,769 B2
(45) Date of Patent: Sep. 6, 2022

(54) MOTOR DRIVING APPARATUS AND LAUNDRY TREATING APPARATUS INCLUDING THE SAME

(71) Applicant: LG ELECTRONICS INC., Seoul (KR)

(72) Inventor: Hanbeom Yeom, Seoul (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 16/907,508

(22) Filed: Jun. 22, 2020

(65) Prior Publication Data

US 2021/0016665 A1 Jan. 21, 2021

(30) Foreign Application Priority Data

Jul. 17, 2019 (KR) .................. 10-2019-0086431

(51) Int. Cl.
*B60L 3/00* (2019.01)
*B60L 7/10* (2006.01)
*B60L 50/52* (2019.01)
*D06F 37/30* (2020.01)

(52) U.S. Cl.
CPC ............... *B60L 3/0023* (2013.01); *B60L 7/10* (2013.01); *B60L 50/52* (2019.02); *D06F 37/304* (2013.01)

(58) Field of Classification Search
CPC .................................................... B60L 3/0023
USPC ........................................................ 318/369
See application file for complete search history.

(56) References Cited

U.S. PATENT DOCUMENTS

2005/0160771 A1* 7/2005 Hosoito .................. H02P 21/00
68/12.16
2008/0297099 A1* 12/2008 Maekawa ............. D06F 37/304
318/812

* cited by examiner

*Primary Examiner* — Joseph Chang
(74) *Attorney, Agent, or Firm* — Fish & Richardson P.C.

(57) ABSTRACT

Provided are a motor driving apparatus and a clothing treatment apparatus including the same. The motor driving apparatus includes an inverter unit including a plurality of upper switches and a plurality of lower switches and configured to output AC power to a motor by a switching operation and a processor configured to control the inverter unit to perform power generation braking by maintaining the plurality of upper switches in a full off state and maintain the plurality of lower switches in a full on state. The processor performs a current control step of complementarily switching phase currents flowing into the plurality of upper switches and the plurality of lower switches prior to the power generation braking.

20 Claims, 6 Drawing Sheets

MOTOR DRIVING APPARATUS AND LAUNDRY TREATING APPARATUS INCLUDING THE SAME

This application claims priority to and the benefit of Korean Patent Application No. 10-2019-0086431, filed on Jul. 17, 2019.

TECHNICAL FIELD

The present disclosure relates to a motor driving apparatus for performing power generation braking and a home appliance including the same.

BACKGROUND

A laundry treatment apparatus is an apparatus for treating laundry through several actions, such as washing, dehydration and/or dry.

A motor driving apparatus for driving a motor including a rotor performing a rotation movement and a stator on which a coil is wound may be divided into a motor driving apparatus using a sensor method using a sensor and a motor driving apparatus using a sensorless method not using a sensor.

Among the types of motor driving apparatuses, the motor driving apparatus using the sensorless method is a lot used due to a reduced manufacturing cost. In the motor driving apparatus using the sensorless method, research for efficiently driving the motor is carried out.

Furthermore, a direct drive method of directly transmitting the turning force of the motor to a pulsator or drum through a gear unit has been developed as a method of efficiently driving the motor. The rotation speed of the motor is also significantly increased for the purpose of dehydration performance improvements and rapid dehydration.

A clothing treatment apparatus based on the direct drive method using the gear unit includes a coupling member between a rotor bush to which the rotation shaft of the motor has been coupled and the gear unit. A given gap is formed between the rotor bush and the coupling member or between the gear unit and the coupling member.

Accordingly, when the braking of the motor is performed, noise may occur because the rotor bush and the coupling member collide against each other or the coupling member and the gear unit collide against each other.

In particular, a difference between inertia occurring in the rotor bush and inertia occurring in the pulsator or the drum is increased as the gear ratio of the gear unit is increased in order to reduce power consumption of a washing machine. Accordingly, noise attributable to a collision between the rotor bush and the coupling member and a collision or between the coupling member and the gear unit may be increased. Such noise is further increased as the RPM of the motor is increased.

Accordingly, this applicant proposed braking logic illustrating in FIG. 1 in order to reduce noise occurring upon motor braking.

The braking logic illustrated in FIG. 1 is described below, and includes spare braking, intermediate braking, and power generation braking.

In this case, the spare braking means that the rotation speed of the motor is naturally decelerated by maintaining, in a full off state, a plurality of upper switches and a plurality of lower switches included in an inverter unit for a given time.

Furthermore, the power generation braking means that the rotation speed of the motor is artificially decelerated by maintaining, in the full off state, the plurality of upper switches included in the inverter unit and maintaining, in a full on state, the plurality of lower switches included in the inverter unit.

Furthermore, the intermediate braking means that the upper switches of the inverter unit are maintained in the full off state and the duty ratio of the lower switches is linearly increased.

Accordingly, if the intermediate braking is performed between the spare braking and the power generation braking, the power generation braking can be entered in the state in which the braking power slowly increases. Accordingly, noise occurring when the spare braking switches to the power generation braking is reduced compared to a case not using the intermediate braking.

According to conventional braking logic including the intermediate braking, however, as illustrated in FIG. 2, when the intermediate braking switches to the power generation braking, the size of a dq-axis current is instantly changed approximately 2 A to 3 A.

Accordingly, braking noise occurs at power generation braking timing because an instant change of current occurring upon switching from the intermediate braking to the power generation braking is transmitted to the apparatus. Accordingly, there is a need to develop a technology capable of effectively reducing noise occurring at power generation braking timing.

SUMMARY

The present disclosure provides a motor driving apparatus capable of minimizing noise occurring at power generation braking timing of a motor and a clothing treatment apparatus including the motor driving apparatus.

Furthermore, the present disclosure provides a motor driving apparatus capable of preventing an element directly or indirectly coupled to a motor from being damaged upon power generation braking of the motor and a clothing treatment apparatus including the motor driving apparatus.

That is, the present disclosure provides a motor driving apparatus capable of preventing noise occurring in an apparatus including a motor and also increasing the safety of the apparatus including the motor when power generation braking of the motor is performed, and a clothing treatment apparatus including the motor driving apparatus In an aspect, a motor driving apparatus an inverter unit including a plurality of upper switches and a plurality of lower switches and configured to output AC power to a motor by a switching operation and a processor configured to control the inverter unit to perform power generation braking by maintaining the plurality of upper switches in a full off state and maintain the plurality of lower switches in a full on state.

In this case, the processor is configured to set an initial current value in n (n=0, 1, 2, 3, . . . )-th power generation braking as an initial current value of (n+1)-th power generation braking and to control the inverter unit to first perform an (n+1)-th current control step of controlling a dq-axis current amount based on the set initial current value of the (n+1)-th power generation braking and then perform the (n+1)-th power generation braking. In the current control step, phase currents flowing into the plurality of upper switches and the plurality of lower switches prior to the power generation braking are complementarily switched.

In an embodiment, the processor may be configured to set a d-axis current to −2 A to −3 A and a q-axis current to 0 A in a primary current control step when the n is 0 (zero).

In an embodiment, the processor may be configured to set, as an initial current value in power generation braking in a next degree, a current value detected within 10 ms from the (n+1)-th power generation braking timing.

In an embodiment, the processor may be configured to perform spare braking for maintaining the pluralities of upper switches and lower switches of the inverter unit in the full off state and then perform the current control step and to perform the power generation braking after performing the current control step.

In an embodiment, the processor may be configured to substantially identically set sizes of phase currents flowing into the plurality of upper switches and the plurality of lower switches in the current control step. The current control step may be performed for 100 ms.

In an embodiment, the processor may be configured to calculate a d-axis current value ($I_d^\#$) and a q-axis current value ($I_q^\#$) using an equation below in the current control step.

$$I_d^\# = (I_{ds}/10) * Cnt$$

$$I_q^\# = (I_{dq}/10) * Cnt$$

In the equation,

Cnt: 1 to 10, and increases by one per 10 ms starting from 1.

$I_{ds}$: an initial d-axis current value in a previously-generated power generation braking step $I_{dq}$: an initial q-axis current value in a previously-generated power generation braking step.

A clothing treatment apparatus including the motor driving apparatus having such a configuration may further include a transmission system for changing torque generated by the motor. The transmission system may includes a first shaft unit connected to a pulsator, a bush provided in a rotor of the motor, a second shaft unit inserted into the bush, a third shaft unit connected to a tub of the clothing treatment apparatus, a gear unit positioned between the first shaft unit and the second shaft unit to change torque generated by the motor, and a coupling positioned between the rotor and the third shaft unit in a way to be movable up and down.

The motor driving apparatus according to the present disclosure can reduce each of a d-axis current change amount and q-axis current change amount at power generation braking timing within 0.1 A by controlling a dq-axis current before performing power generation braking.

Accordingly, noise occurring due to a sudden change in the dq-axis current at power generation braking timing can be reduced.

BRIEF DESCRIPTION OF THE DRAWINGS

The accompanying drawings, which are included to provide a further understanding of the invention and are incorporated in and constitute a part of this specification, exemplarily represent embodiments of the invention and together with the description serve to explain the principles of the invention. In the drawings.

DETAILED DESCRIPTION

Figure 1:
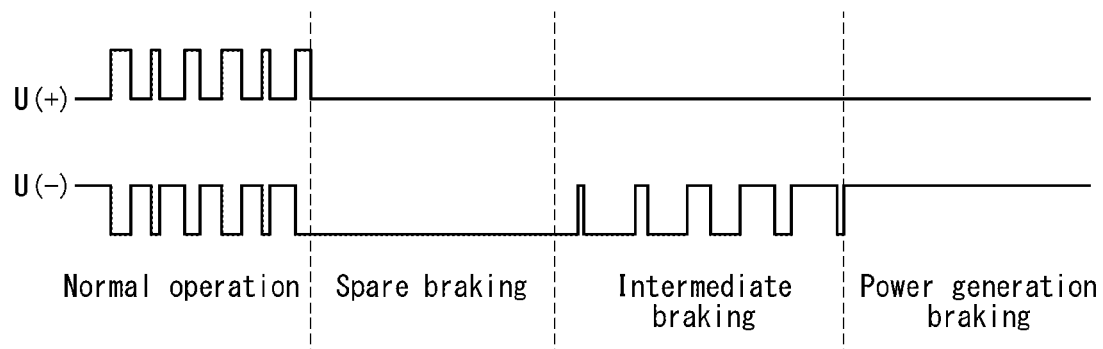
FIG. 1 is a graph illustrating an operating state of the upper and lower switches of an inverter in braking logic according to a conventional technology.
Figure 2:
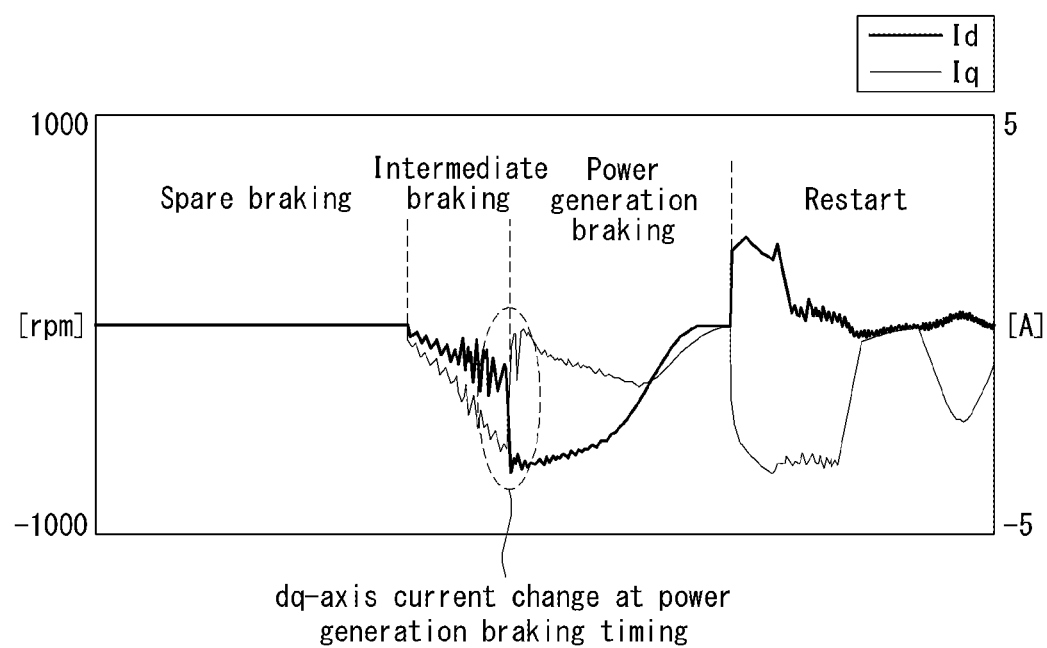
FIG. 2 is a graph illustrating a dq-axis current at braking timing in the braking logic according to a conventional technology.

The present disclosure may be changed in various ways and may have various embodiments, and specific embodiments are illustrated in the drawings and described in detail. It is however to be understood that the present disclosure is not intended to be limited to the specific disclosure and that the present disclosure includes all changes, equivalents and substitutions which fall within the spirit and technological scope of the present disclosure.

In describing the present disclosure, terms, such as a first and a second, may be used to describe various elements, but the elements may not be restricted by the terms. The terms are used to only distinguish one element from the other element.

For example, a first element may be named a second element without departing from the scope of rights of the present disclosure. Likewise, a second element may be named a first element.

The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements.

In contrast, when it is described that one element is "directly connected" or "directly coupled" to the other element, it should be understood that a third element does not exist between the two elements.

The terms used in this application are used to only describe specific embodiments and are not intended to restrict the present disclosure. An expression of the singular number may include an expression of the plural number unless clearly defined otherwise in the context.

It is to be understood that in this application, a term, such as "include (or comprise)" or "have", is intended to designate that a characteristic, number, step, operation, element or part which is described in this application or a combination of them are present and does not exclude the existence or possible addition of one or more other characteristics, numbers, steps, operations, elements, parts or combinations of them in advance.

All terms used herein, including technical terms or scientific terms unless defined otherwise in this application, have the same meanings as those commonly understood by a person having ordinary skill in the art to which the present disclosure pertains.

Terms, such as those commonly used and defined in dictionaries, should be construed as having the same meanings as those in the context of a related technology, and should not be construed as having ideal or excessively formal meanings unless explicitly defined otherwise in this application.

The following embodiments are provided to fully describe the present disclosure to a person having ordinary knowledge in the art to which the present disclosure pertains.

Accordingly, the shapes, sizes, etc. of elements in the drawings may be exaggerated to make the description clear.

Figure 3:
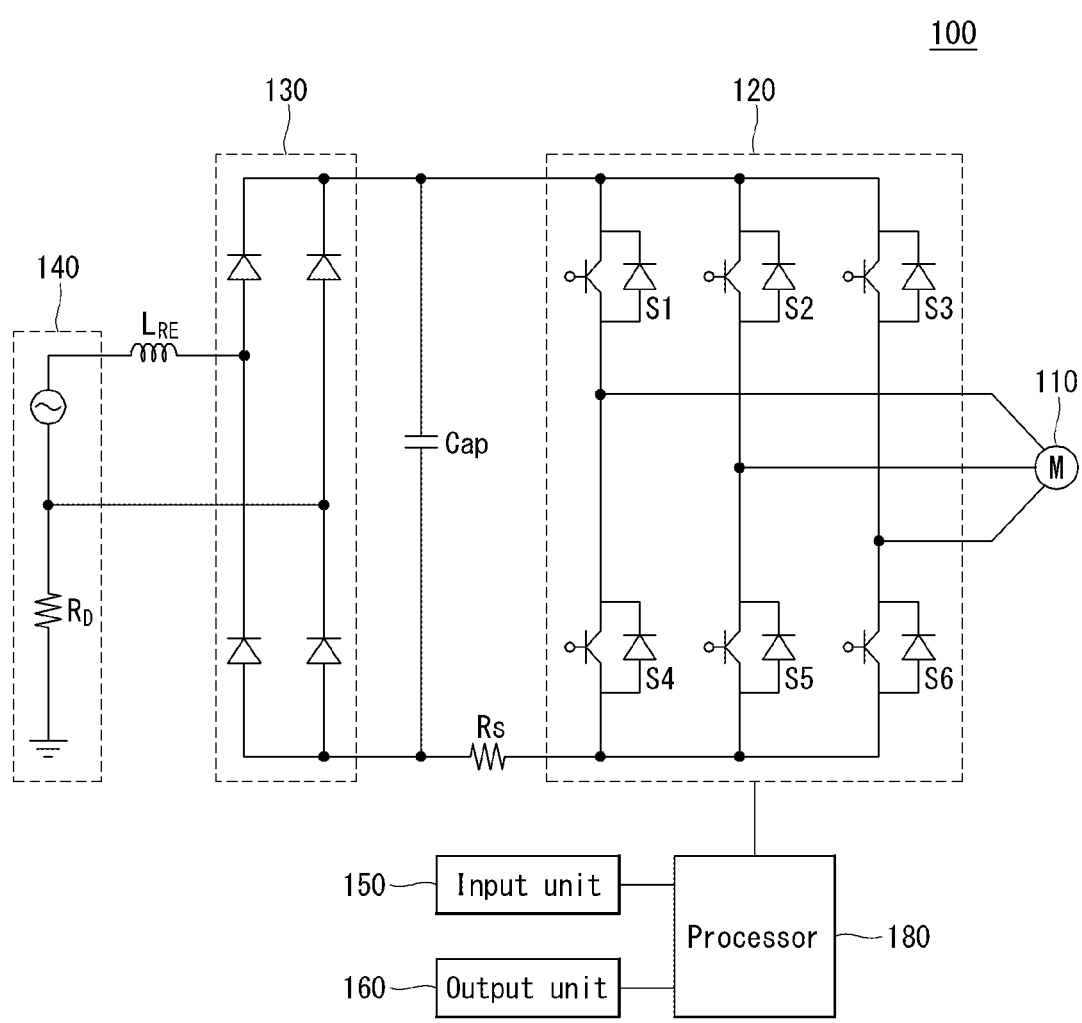
FIG. 3 is a circuit diagram of a motor driving apparatus according to an embodiment of the present disclosure.

Referring to FIG. 3, the motor driving apparatus 100 may include a motor unit 110, an inverter unit 120, a rectification unit 130, an input power unit 140, an input unit 150, an output unit 160 and a processor 180.

The motor unit 110 may be a motor for rotating the pulsator of a washing machine. Furthermore, the motor unit 110 may be a motor for rotating the drum of a washing machine. For example, the motor unit 110 may be a 3-phase motor.

The rectification unit 130 may receive an input power source from the input power unit 140, may rectify the received input power source, and may convert the power source in a form of a DC voltage. That is, the rectification unit 130 may output a DC voltage having a constant level.

A DC-stage capacitor Cap may be connected to both ends of the rectification unit 130. The DC-stage capacitor Cap may smooth and store the DC voltage output by the rectification unit 130.

In an embodiment, the DC-stage capacitor Cap may be a DC link capacitor.

The DC voltage smoothed by the DC link capacitor as described above may be transmitted to the inverter unit 120.

The inverter unit 120 may include a plurality of switches. More specifically, if the motor unit 110 is a 3-phase motor, the inverter unit 120 may include a switch pair corresponding to each phase.

That is, the inverter unit 120 may include first to sixth switches S1, S2, S3, S4, S5, and S6. For example, a MOSFET or an insulated gate bipolar transistor (IGBT) may be used as the switch.

Referring to FIG. 3, the first to third switches S1, S2, and S3 may have collectors each coupled to one end of the DC link capacitor Cap. The fourth to sixth switches S4, S5 and S6 may have emitters each coupled to the other end of the DC link capacitor.

In this case, the plurality of switches included in the inverter unit may be classified into upper switches and lower switches depending on their installation locations.

According to such classification, the first to third switches S, S2, and S3 may be defined as the upper switches, and the fourth to sixth switches S4, S5 and S6 may be defined as the lower switches.

The inverter unit 120 may convert, into 3-phase AC power, the DC voltage received from the DC link capacitor, and may apply the 3-phase AC power to the motor unit 110. The inverter unit 120 may be defined as a 3-level inverter.

A shunt resistor $R_S$ for detecting the phase current of the motor unit 110 may be provided between the inverter unit 120 and the DC link capacitor Cap. However, the shunt resistor may be omitted.

A reactor $L_{RE}$ for stabilizing an impact on a transformer attributable to an inrush current, which may occur in the rectification unit 130 when the input power source is applied to the rectification unit 130, may be provided between the rectification unit 130 and the input power unit 140. The reactor may be formed as an inductor and may be omitted.

The processor 180 may output, to the inverter unit 120, an inverter control signal to control the 3-level inverter.

In general, the inverter control signal may be a pulse width modulation (PWM) control signal.

The PWM control signal may include a control signal for adjusting the duty ratio of the switches included in the inverter unit.

In general, the duty ratio means an on duty ratio, that is, a ratio of time during which the state of a switch is an on state in a given time interval. Accordingly, a maximum value of the duty ratio is 100%, and a minimum value of the duty ratio is 0%.

In the present disclosure, the setting of the duty ratio of the switch as a maximum value is defined as the full on mode of the switch. The setting of the duty ratio of the switch as a minimum value is defined as the full off mode of the switch.

That is, the time for which the state of the switch is maintained in an on state and the time for which the state of the switch is maintained in an off state during one cycle of the switch may be changed based on the duty ratio of the switch set by the processor 180.

In this case, the state in which the state of the switch continues to be maintained in the on state during one cycle of the switch is defined as the full on state of the switch. The state in which the state of the switch continues to be maintained in the off state during one cycle of the switch is defined as the full off state of the switch.

Furthermore, the processor 180 may further include a memory (not illustrated) for storing data to control an inverter controller.

The input unit 150 may receive user inputs related to an operation of the motor unit 110 and an operation of the inverter unit 120. When a user input is received, the input unit may transmit, to the processor 180, a signal corresponding to the received user input.

The output unit 160 may receive a given signal from the processor 180 and operate based on the received signal.

Specifically, the output unit 160 may include output elements, such as a light-emitting diode (LED), an OLED, a buzzer.

Some of the elements of a washing machine including a gear unit are described below with reference to FIG. 4.

Figure 4:
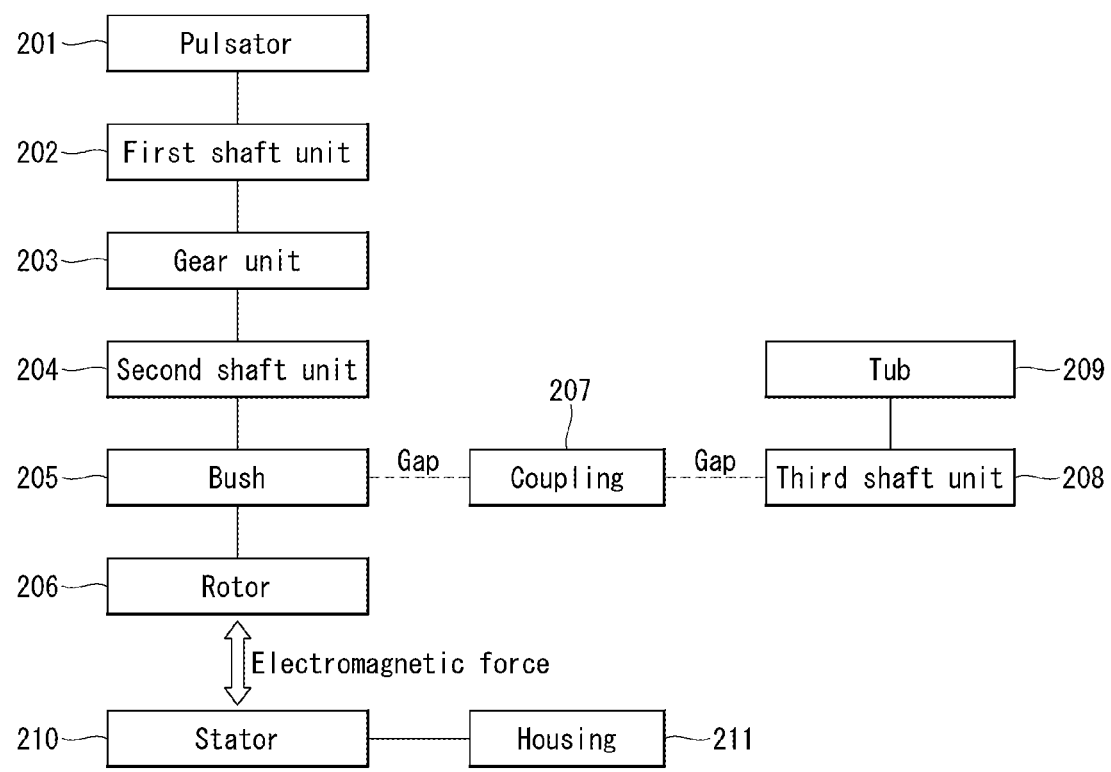
FIG. 4 is a block diagram illustrating the elements of a washing machine including a gear unit.

For reference, FIG. 4 illustrates a washing machine using a pulsator method, but the present disclosure is not limited thereto. FIG. 4 may be applied to a washing machine using a drum method.

As illustrated in FIG. 4, a gear unit 203 may be positioned between a pulsator 201 and an element included in a motor.

Specifically, a first shaft unit 202 may be connected to the center of the pulsator 201. Accordingly, the pulsator 201 and the first shaft unit 202 may be rotated together.

The motor unit 110 may include a rotor 206, a stator 210 and a housing 211. The rotor 206 may be rotated by a magnetic field generated by the stator 210.

A bush 205 may be positioned at the center of the rotor 206. A second shaft unit 204 may be inserted into the bush 205. Accordingly, the rotor 206, the bush 205 and the second shaft unit 204 may be rotated together.

The gear unit 203 may be positioned between the second shaft unit 204 and the first shaft unit 202. The gear unit 203 may be connected to the first shaft unit 202 and the second shaft unit 204.

In this case, the gear unit 203 may be configured to be engaged with saw-toothed parts (not illustrated) formed in the insides of the first shaft unit 202 and the second shaft unit 204.

The first shaft unit 202, the gear unit 203 and the second shaft unit 204 may be disposed in such a way to be rotated within the third shaft unit 208.

A tub 209 may be coupled to the top of a third shaft unit 208. The bottom of the third shaft unit 208 may be spaced apart from the top of the bush 205 at a given interval.

For reference, the first shaft unit and the third shaft unit 202 and 204 may be defined as a washing shaft. The third shaft unit 208 may be defined as a dehydration shaft.

A coupling 207 may be positioned between the third shaft unit 208 and the bush 205. In an embodiment, the coupling 207 may be positioned in a way to be movable up and down.

That is, the coupling 207 may move up and down and restrict the third shaft unit 208 so that only the first and second shaft units are rotated, or may move down and transmit the turning force of the rotor 206 to the first to third shaft units so that the first shaft unit to the third shaft unit are rotated at the same time.

Figure 5:
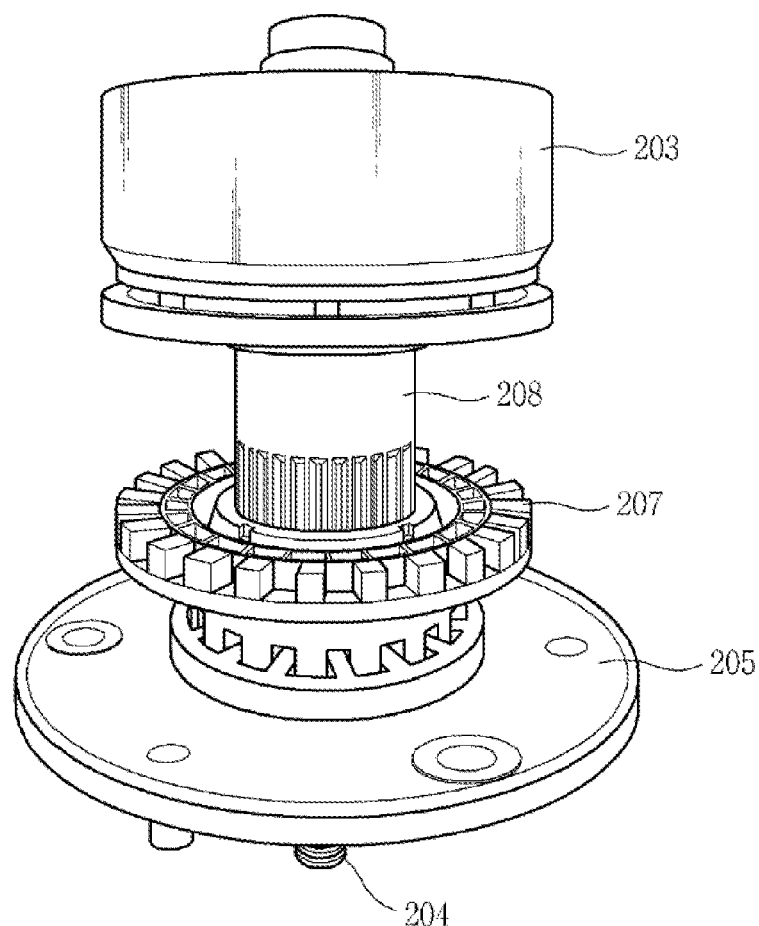
FIG. 5 is a concept view illustrating parts connected to a gear unit.

Parts connected to the gear unit 203 are described below with reference to FIG. 5.

A gap having a given interval is formed between the bush 205 and the coupling 207. When the braking of the motor is performed, there is a possibility that noise may occur because the bush 205 and the coupling 207 collide against each other due to such a gap.

Specifically, a relative speed difference between the third shaft unit 208 and the second shaft unit 204 occurs due to a torque change. The contact state of the coupling 207 with the bush 205 or the third shaft unit 208 is changed due to the speed difference.

That is, the inertia of the first shaft unit and second shaft unit defined as the washing shaft is smaller than the inertia of the third shaft unit defined as the dehydration shaft by the application of the gear unit 203. Accordingly, upon braking of the motor, a collision occurs between the coupling 207 and the bush 205, and noise occurs due to the collision.

For reference, an example in which the elements of the washing machine illustrated in FIGS. 4 and 5 operate according to the cycle of the washing machine is described below.

When laundry and washing water are supplied to the tub and then a washing cycle starts, a magnetic field is generated from the stator in response to a power source applied to the stator 210. The rotor 206 is rotated by the magnetic field of the stator 210.

The turning force of the rotor 206 is transmitted to the bush 205. The turning force transmitted to the bush is transmitted to the second shaft unit 204.

At this time, the coupling 207 moves up and down and thus the protruded parts of the coupling are discharged from grooves formed in the bush 205. Accordingly, the turning force of the rotor 206 is transmitted to only the second shaft unit 204.

The RPM of the second shaft unit 204 is decelerated to a given gear ratio in the gear unit 203. The first shaft unit 202 and the pulsator 201 perform a washing cycle while being rotated at a low speed of the decelerated RPM.

After the washing cycle is completed, a rinse cycle is performed. When the rinse cycle is completed, a dehydration cycle is performed in order to minimize moisture included in laundry.

In the dehydration cycle, the coupling 207 moves down. Accordingly, the protruded parts of the coupling 207 are inserted into the grooves formed in the bush 205. That is, one side of the coupling 207 and one side of the bush 205 are engaged.

At this time, the turning force of the rotor 206 is transmitted to all of the first to third shaft units. Accordingly, the pulsator 201 connected to the first and second shaft units and the tub 209 connected to the third shaft unit are simultaneously rotated at a high speed.

The laundry is washed through the washing cycle, the rinse cycle and the dehydration cycle. Recently, a dry cycle is separately added after the dehydration cycle.

A method of controlling the motor driving apparatus according to an embodiment of the present disclosure is described below.

Figure 6:
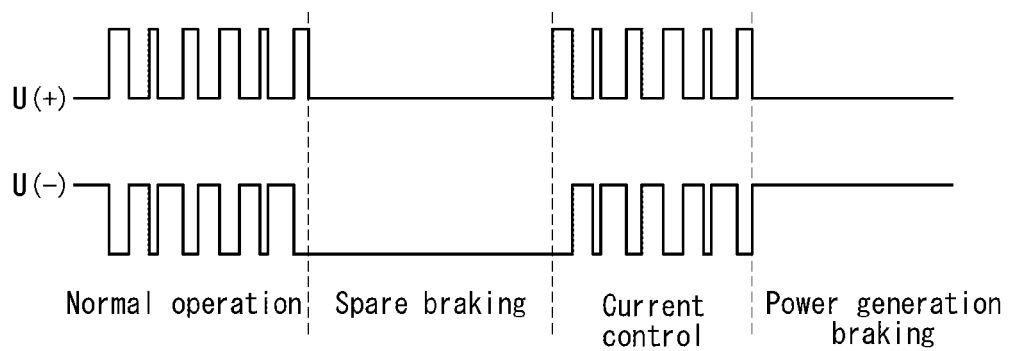
FIG. 6 is a flowchart illustrating a method of controlling the motor driving apparatus according to an embodiment of the present disclosure.
Figure 7A:
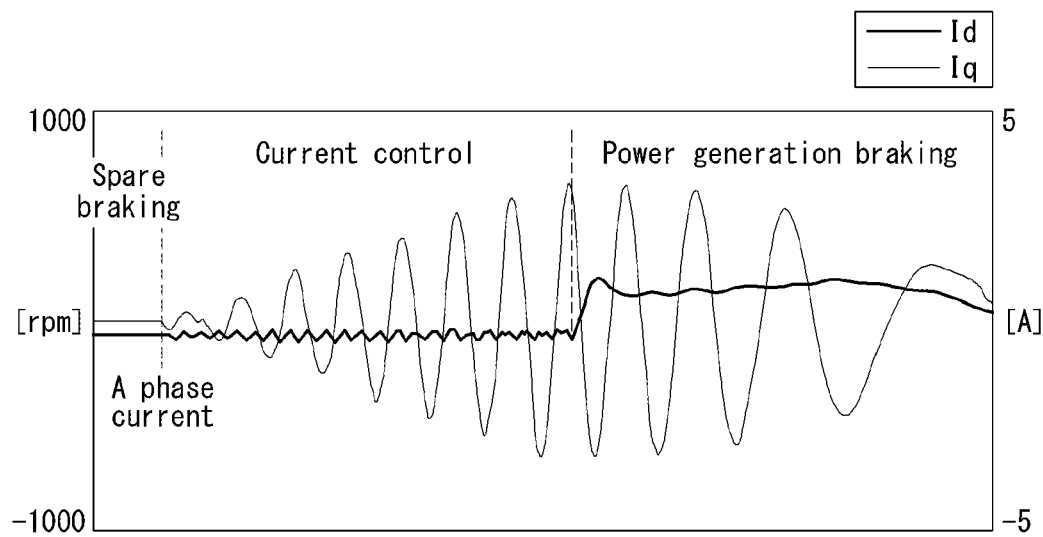
FIGS. 7A and 7B are graphs illustrating an operating state of the upper and lower switches of an inverter in braking logic according to an embodiment of the present disclosure.
Figure 7B:
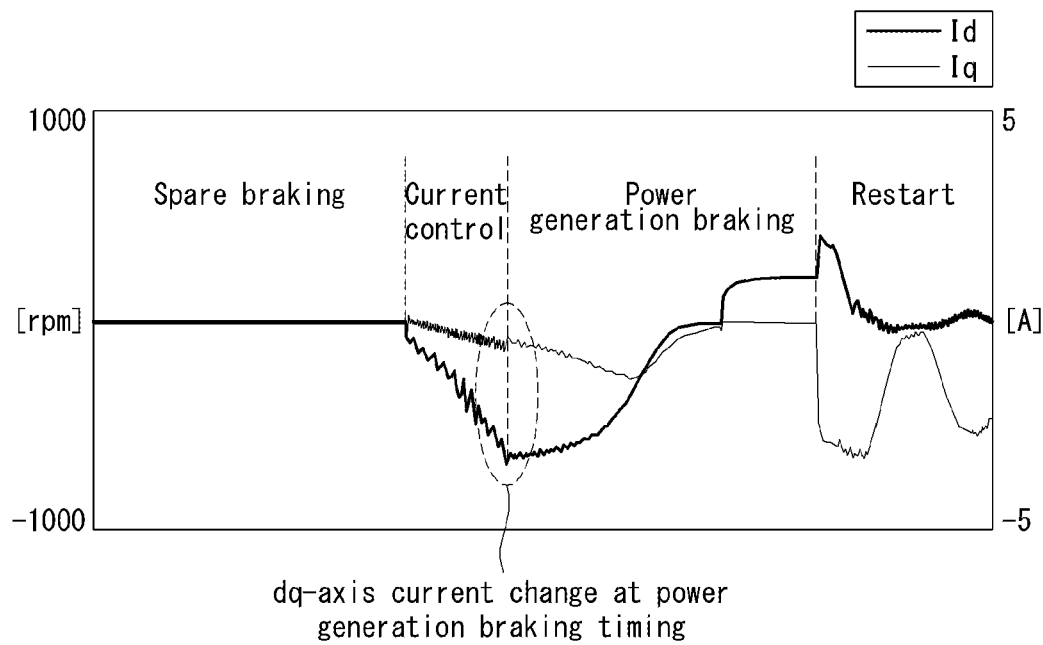
Figure 8:
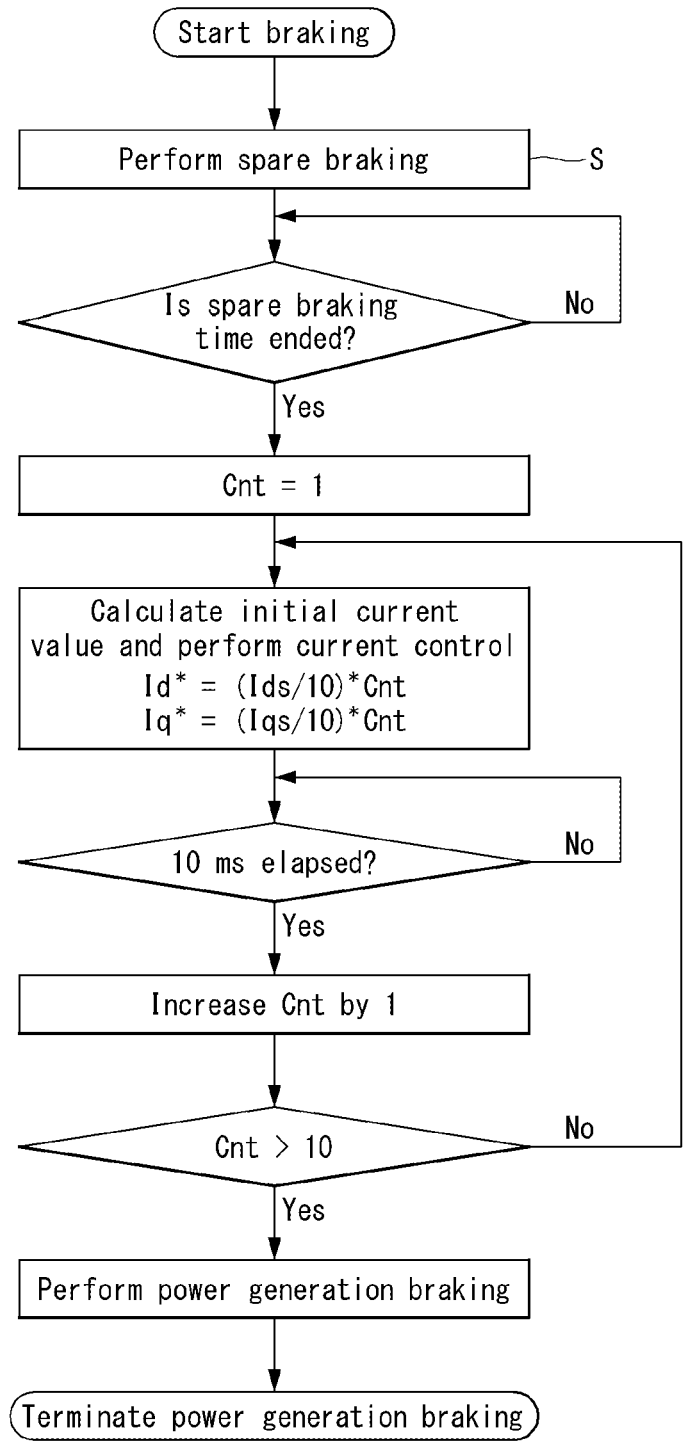
FIG. 8 is a graph illustrating a dq-axis current at braking timing in the braking logic according to an embodiment of the present disclosure.

Referring to FIGS. 6 to 8, when braking starts, the processor 180 of the motor driving apparatus performs spare braking for a given time.

When the spare braking starts, the state of the plurality of upper switches and the plurality of lower switches maintain the full off state.

When time required for the spare braking elapses, the processor 180 set a count (Cnt) to 1, calculates an initial current value of power generation braking and then performs a current control step based on the calculated initial current value.

In this case, the current control step means that the initial current value detected in power generation braking in a previous degree is set as an initial current value of power generation braking in a current degree and a dq-axis current amount is controlled based on the set initial current value.

In the current control step, phase currents flowing into the plurality of upper switches and the plurality of lower switches of the inverter unit are complementarily switched.

In this case, "complementary switching" means that the on/off of the upper switches and the on/off of the lower switches are switched in a manner opposite to each other.

That is, in the current control step, when the upper switches become on, the lower switches become off. When the upper switches become off, the lower switches become on.

Furthermore, at timing at which the power generation braking is entered in the current control step, the sizes of the phase current of the upper switches and the phase current of the lower switches are substantially identical, the upper switches become off, and the lower switches become on.

That is, the power generation braking is entered in the state in which the upper switches have become off and the lower switches have become on.

FIG. 6 illustrates that the duty ratios of phase currents applied to the upper switches and lower switches in the current control step are identical with the duty ratios of phase currents applied to the upper switches and lower switches upon normal operation. However, the duty ratios of phase currents applied to the upper switches and lower switches in the current control step may be different from the duty ratios of phase currents applied to the upper switches and lower switches upon normal operation.

For example, the duty ratios of phase currents applied to the upper switches and lower switches in the current control step may be increased over time.

For another example, the duty ratios of phase currents applied to the upper switches and lower switches in the current control step may be increased or decreased over time.

As described above, the duty ratios of phase currents applied to the upper switches and lower switches in the current control step may be changed in various forms.

In the current control step, an A-phase current may be linearly increased from 0 (zero) to an initial current of the power generation braking.

In the current control step, a d-axis current value ($I_d^\#$) and a q-axis current value ($I_q^\#$) may be calculated again in a given time unit (e.g., 10 ms). The current control step may be performed for a total of 100 ms.

However, a total time for which the current control step is performed may be variously changed. A time unit by which the d-axis current value ($I_d^\#$) and the q-axis current value ($I_q^\#$) are calculated again may be variously changed.

For example, the current control step may be performed for a total of 150 ms or for a total of 200 s. In some embodiments, the current control step may be performed for a total of 80 ms.

Furthermore, the time unit by which the d-axis current value ($I_d^\#$) and the q-axis current value ($I_q^\#$) are calculated again may be 2.5 ms or 5 ms.

As described above, the total time for which the current control step is performed and the time unit by which the d-axis current value ($I_d^\#$) and the q-axis current value ($I_q^\#$) are calculated again may be changed, if necessary.

For example, in the current control step, the d-axis current value ($I_d^\#$) and the q-axis current value ($I_q^\#$) may be calculated using an equation below.

$$I_d^\# = (I_{ds}/10)*Cnt$$

$$I_q^\# = (I_{dq}/10)*Cnt$$

In the equation,

Cnt: 1 to 10. Cnt increases by one per 10 ms starting from 1.

$I_{ds}$: an initial d-axis current value in a previously-generated power generation braking step $I_{dq}$: an initial q-axis current value in a previously-generated power generation braking step According to such a configuration, the processor 180 may set an initial current value in n (n=0, 1, 2, 3, . . . )-th power generation braking as an initial current value of (n+1)-th power generation braking, and may control the inverter unit to perform an (n+1)-th current control step of controlling a dq-axis current amount based on the set initial current value of the (n+1)-th power generation braking and then perform the (n+1)-th power generation braking.

However, if power generation braking has not been performed, that is, when n is 0 (zero), values of $I_{ds}$ and $I_{dq}$ are 0 (zero).

Accordingly, if power generation braking has not been performed, that is, in a primary current control step in which a current control step is first performed, a d-axis current may be set to −2 A to −3 A, and a q-axis current may be set to 0 A.

Furthermore, a current value detected within 10 ms from power generation braking timing in a previous degree may be used as the values of $I_{ds}$ and $I_{dq}$.

When a set time (e.g., 100 ms) elapses, the processor 180 performs the power generation braking.

The power generation braking means that the rotation speed of the motor is artificially decelerated by maintaining the state of the plurality of upper switches of the inverter unit in the full off state and maintaining the plurality of lower switches of the inverter unit in the full on state.

The motor driving apparatus according to an embodiment of the present disclosure detects a dq-axis current upon previous power generation braking and calculates a dq-axis current amount in a present current control step based on the detected dq-axis current, and thus can reduce a change in the dq-axis current regardless of an operation condition when entering power generation braking.

Accordingly, a d-axis current change amount and a q-axis current change amount at power generation braking timing can be minimized. For example, each of a d-axis current change amount and a q-axis current change amount at power generation braking timing may be within 0.1 A.

Accordingly, noise occurring due to a sudden change in the dq-axis current amount at power generation braking timing can be reduced.

What is claimed is:

1. A motor driving apparatus comprising:
    an inverter unit comprising a plurality of pairs of switches, each pair of switches comprising an upper switch and a lower switch, the inverter unit being configured to output alternating current (AC) power to a motor by a switching operation of the plurality of pairs of switches; and
    a processor configured to:
        perform a current control operation comprising (i) applying phase currents to one or more of the upper switches while the lower switches are turned off and (ii) applying the phase currents to one or more of the lower switches while the upper switches are turned off, and
        based on performing the current control operation, control the inverter unit to perform a power generation braking operation comprising turning off all of the upper switches and turning on all of the lower switches.

2. The motor driving apparatus of claim 1, wherein the power generation braking operation comprises a plurality of power generation braking steps that are sequentially performed over time, and
    wherein the processor is configured to:
        set an initial current value of one of the power generation braking steps based on initial current values of power generation braking steps performed prior to the one of the power generation braking steps; and
        control the inverter unit to (i) perform the current control operation by controlling an amount of a dq-axis current among the phase currents based on the initial current value of the one of the power generation braking steps, and (ii) then perform the power generation braking operation.

3. The motor driving apparatus of claim 2, wherein the current control operation comprises a primary current control step performed before a first step among the power generation braking steps,
    wherein the phase currents comprise a d-axis current and a q-axis current, and
    wherein the processor is configured to, in the primary current control step, set an amount of the d-axis current to −2 A to −3 A and an amount of the q-axis current to 0 A.

4. The motor driving apparatus of claim 3, wherein the processor is further configured to:
    within 10 ms from a start point of the one of the power generation braking steps, detect a current value applied to the lower switches; and
    set the current value as an initial current value of a power generation braking step subsequent to the one of the power generation braking steps.

5. The motor driving apparatus of claim 1, wherein the processor is further configured to:
    perform a spare braking operation comprising turning off all of the upper switches and the lower switches; and
    after performing the spare braking operation, perform the current control operation.

6. The motor driving apparatus of claim 5, wherein the processor is configured to, in the current control operation:
apply first current values of the phase currents to the upper switches; and
apply second current values of the phase currents to the lower switches, the second current values being substantially equal to the first current values.

7. The motor driving apparatus of claim 5, wherein the processor is configured to perform the current control operation for 100 ms.

8. The motor driving apparatus of claim 7, wherein the phase currents comprise a d-axis current and a q-axis current, and
wherein the processor is configured to, in the current control operation:
determine a d-axis current value ($I_d^{\#}$) using a first equation ($I_d^{\#}=(I_{ds}/10)*Cnt$); and
determine a q-axis current value ($I_q^{\#}$) using a second equation ($I_q^{\#}=(I_{dq}/10)*Cnt$),
where Cnt denotes an integer from 1 to 10 with an increment by one per 10 ms starting from 1, $I_{ds}$ denotes an initial d-axis current value of a previous power generation braking step, and $I_{dq}$ denotes an initial q-axis current value of a previous power generation braking step.

9. A clothing treatment apparatus comprising:
a motor configured to generate torque;
a transmission system configured to change a magnitude or a direction of the torque generated by the motor;
an inverter unit including a plurality of pairs of switches, each pair of switches comprising an upper switch and a lower switch, the inverter unit being configured to output alternating current (AC) power to a motor by a switching operation of the plurality of pairs of switches; and
a processor configured to:
perform a current control operation comprising (i) applying phase currents to one or more of the upper switches while the lower switches are turned off and (ii) applying the phase currents to one or more of the lower switches while the upper switches are turned off, and
after performing the current control operation, control the inverter unit to perform a power generation braking operation comprising turning off all of the upper switches and turning on all of the lower switches.

10. The clothing treatment apparatus of claim 9, wherein the power generation braking operation comprises a plurality of power generation braking steps that are sequentially performed over time, and
wherein the processor is configured to:
set an initial current value of one of the power generation braking steps based on initial current values of power generation braking steps performed prior to the one of the power generation braking steps, and
control the inverter unit to (ii) perform the current control operation by controlling an amount of a dq-axis current among the phase currents based on the initial current value of the one of the power generation braking steps, and (ii) then perform the power generation braking operation.

11. The clothing treatment apparatus of claim 10, wherein the current control operation comprises a primary current control step performed before a first step among the power generation braking steps, and
wherein the phase currents comprise a d-axis current and a q-axis current, and
wherein the processor is configured to, in the primary current control step, set an amount of the d-axis current to −2 A to −3 A and an amount of the q-axis current to 0 A.

12. The clothing treatment apparatus of claim 11, wherein the processor is further configured to:
within 10 ms from a start point of the one of the power generation braking steps, detect a current value applied to the lower switches; and
set the current value as an initial current value of a power generation braking step subsequent to the one of the power generation braking steps.

13. The clothing treatment apparatus of claim 9, wherein the processor is configured to:
perform a spare braking operation comprising turning off all of the upper switches and the lower switches; and
after performing the spare braking operation, perform the current control operation.

14. The clothing treatment apparatus of claim 13, wherein the processor is configured to, in the current control operation:
apply first current values of the phase currents to the upper switches; and
apply second current values of the phase currents to the lower switches, the second current values being substantially equal to the first current values.

15. The clothing treatment apparatus of claim 13, wherein the processor is configured to perform the current control operation for 100 ms.

16. The clothing treatment apparatus of claim 15, wherein the phase currents comprise a d-axis current and a q-axis current, and
wherein the processor is configured to, in the current control operation:
determine a d-axis current value ($I_d^{\#}$) using a first equation ($I_d^{\#}=(I_{ds}/10)*Cnt$); and
determine a q-axis current value ($I_q^{\#}$) using a second equation ($I_q^{\#}=(I_{dq}/10)*Cnt$),
where Cnt denotes an integer from 1 to 10 with an increment by one per 10 ms starting from 1, $I_{ds}$ denotes an initial d-axis current value of a previous power generation braking step, and $I_{dq}$ denotes an initial q-axis current value of a previous power generation braking step.

17. The clothing treatment apparatus of claim 13, further comprising a tub and a pulsator,
wherein the motor comprises a rotor, and
wherein the transmission system comprises:
a first shaft connected to the pulsator;
a bush disposed at the rotor of the motor;
a second shaft inserted into the bush;
a third shaft connected to the tub;
a gear positioned between the first shaft and the second shaft and configured to change the magnitude or the direction of the torque generated by the motor; and
a coupling positioned between the rotor and the third shaft and configured to move toward and away from the tub.

18. The clothing treatment apparatus of claim 17, wherein the processor is configured to, in the current control operation:
apply first current values of the phase currents to the upper switches; and apply second current values of the phase currents to the lower switches, the second current values being substantially equal to the first current values.

19. The clothing treatment apparatus of claim 17, wherein the processor is configured to perform the current control operation for 100 ms.

20. The clothing treatment apparatus of claim 19, wherein the phase currents comprise a d-axis current and a q-axis current, and
wherein the processor is configured to, in the current control operation:
determine a d-axis current value ($I_d^{\#}$) using a first equation ($I_d^{\#}=(I_{ds}/10)*Cnt$); and
determine a q-axis current value ($I_q^{\#}$) using a second equation ($I_q^{\#}=(I_{dq}/10)*Cnt$),
where Cnt denotes an integer from 1 to 10 with an increment by one per 10 ms starting from 1, $I_{ds}$ denotes an initial d-axis current value of a previous power generation braking step, and $I_{dq}$ denotes an initial q-axis current value of a previous power generation braking step.

\* \* \* \* \*